US009349405B1

(12) United States Patent
Jungrungruangkit et al.

(10) Patent No.: US 9,349,405 B1
(45) Date of Patent: May 24, 2016

(54) METHODS, DEVICES AND SYSTEMS FOR DISPENSING MATERIAL ON AN ELECTRONIC DEVICE

(71) Applicant: Western Digital Technologies, Inc., Irvine, CA (US)

(72) Inventors: Phiphat Jungrungruangkit, Bangkok (TH); Karweng Lee, Cheras (MY); Chii Ching Chee, Subang Jaya (MY); Weerathep Klaypong, Anthong (TH)

(73) Assignee: Western Digital Technologies, Inc., Irvine, CA (US)

( * ) Notice: Subject to any disclaimer, the term of this patent is extended or adjusted under 35 U.S.C. 154(b) by 284 days.

(21) Appl. No.: 13/931,163

(22) Filed: Jun. 28, 2013

Related U.S. Application Data

(60) Provisional application No. 61/826,080, filed on May 22, 2013.

(51) Int. Cl.
*B05C 11/10* (2006.01)
*B05B 7/06* (2006.01)
*G11B 5/84* (2006.01)

(52) U.S. Cl.
CPC .................................... *G11B 5/84* (2013.01)

(58) Field of Classification Search
CPC ................................ B05B 12/04; B05B 12/00
USPC ......... 118/313-315, 305, 679-681, 641-643, 118/665, 686; 228/33, 43
See application file for complete search history.

(56) References Cited

U.S. PATENT DOCUMENTS

| | | | | | |
|---|---|---|---|---|---|
| 5,328,085 | A * | 7/1994 | Stoops | B23K 1/203 118/687 |
| 5,505,777 | A | 4/1996 | Ciardella et al. | |
| 5,796,553 | A | 8/1998 | Tangren | |
| 6,271,996 | B1 | 8/2001 | Houk et al. | |
| 8,233,243 | B2 | 7/2012 | Zhu et al. | |
| 2002/0181157 | A1 | 12/2002 | Serizawa et al. | |
| 2005/0095367 | A1 * | 5/2005 | Babiarz | B05D 3/042 427/421.1 |
| 2009/0155483 | A1 * | 6/2009 | Mariotti | B41J 3/32 427/511 |
| 2010/0178433 | A1 | 7/2010 | Wang et al. | |
| 2011/0048471 | A1 * | 3/2011 | Kikuchi | H01L 21/02057 134/34 |

FOREIGN PATENT DOCUMENTS

NL WO 9213642 A1 * 8/1992 ............ B05B 7/1254

* cited by examiner

*Primary Examiner* — Yewebdar Tadesse

(57) ABSTRACT

A device configured to dispense material at two locations on an electronic device separated by a distance may comprise a controller and first and second material dispensing units comprising, respectively, a first body portion terminated by a first needle portion that defines a first longitudinal axis and a second body portion terminated by a second needle portion that defines a second longitudinal axis. The first and second needle portions may be configured to dispense material onto the electronic device. A positioning assembly may be configured to position the first and second material dispensing units, under control of the controller, such that the first and second longitudinal axes intersect (or appear to intersect from one or more points of view) and such that the material dispensing free ends of the first and second needle portions are spaced away from one another by the distance separating the two predetermined locations.

10 Claims, 3 Drawing Sheets

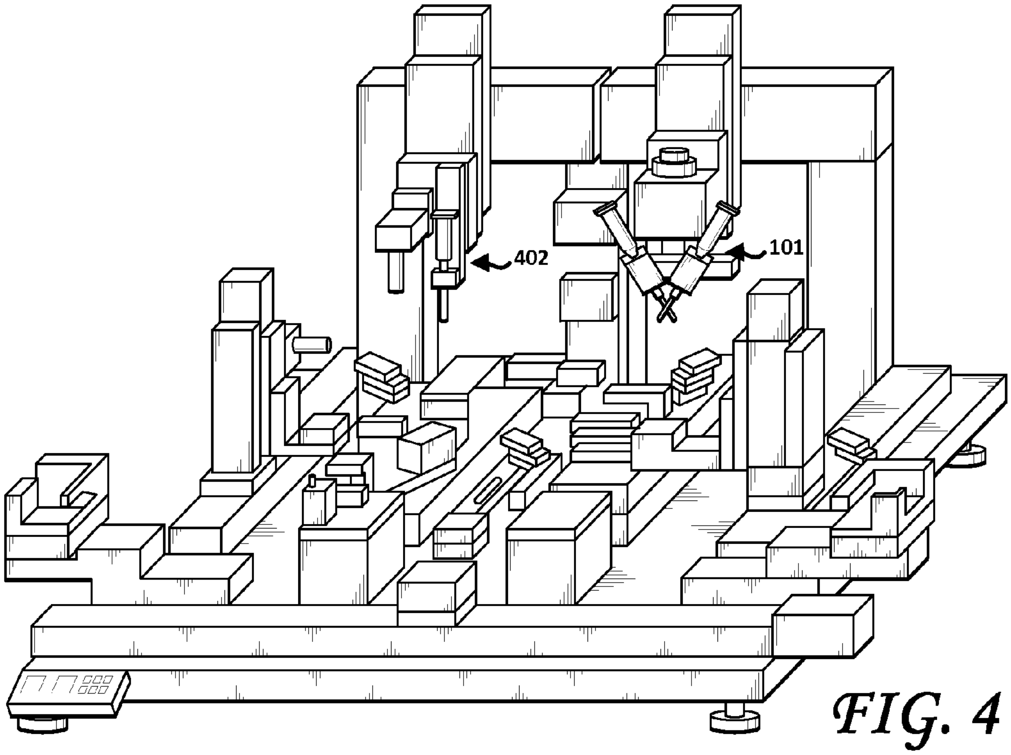

FIG. 4

B51 — PROVIDE FIRST AND SECOND MATERIAL DISPENSING UNITS, COMPRISING RESPECTIVE FIRST AND SECOND BODY PORTIONS TERMINATED BY RESPECTIVE FIRST AND SECOND NEEEDLE PORTIONS

↓

B52 — POSITION FIRST AND SECOND MATERIAL DISPENSING UNITS SUCH THAT FIRST LONGITUDINAL AXIS OF FIRST NEEDLE PORTION INTERSECTS SECOND LONGITUDINAL AXIS OF SECOND NEEDLE PORTION AND SUCH THAT MATERIAL DISPENSING FREE END OF FIRST NEEDLE IS SPACED AWAY FROM MATERIAL DISPENSING FREE END OF SECOND NEEDLE PORTION BY DISTANCE SEPARATING TWO PREDETERMINED LOCATIONS ON ELECTRONIC DEVICE ONTO WHICH MATERIAL IS TO BE DEPOSITED

↓

B53 — DISPENSE, UNDER CONTROL OF CONTROLLER, MATERIAL FROM THE MATERIAL DISPENDING FREE ENDS OF THE FIRST AND SECOND NEEDLE PORTIONS ONTO THE PREDETERMINED LOCATIONS ON ELECTRONIC DEVICE

FIG. 5

METHODS, DEVICES AND SYSTEMS FOR DISPENSING MATERIAL ON AN ELECTRONIC DEVICE

CROSS-REFERENCE TO RELATED APPLICATIONS

This application claims priority to provisional U.S. Patent Application Ser. No. 61/826,080, filed on May 22, 2013, which is hereby incorporated by reference in its entirety.

BACKGROUND

In the manufacture of hard disk drives, conventional Head Stack Assembly (HSA) epoxy dispensers have a single dispense needle that deposits a single epoxy bump, one bump or one coating at a time, on the HSA arms. This is time consuming and increases manufacturing delay.

BRIEF DESCRIPTION OF THE DRAWINGS

FIG. 4 shows a coating/tacking material dispensing station comprising a single material dispensing needle and a computer-controlled device configured to dispense material at two predetermined locations on an electronic device, according to one embodiment.

FIG. 5 is a flowchart of a computer-implemented method of dispensing material at two predetermined locations, separated by a distance, on an electronic device, according to one embodiment.

DETAILED DESCRIPTION

Figure 1:
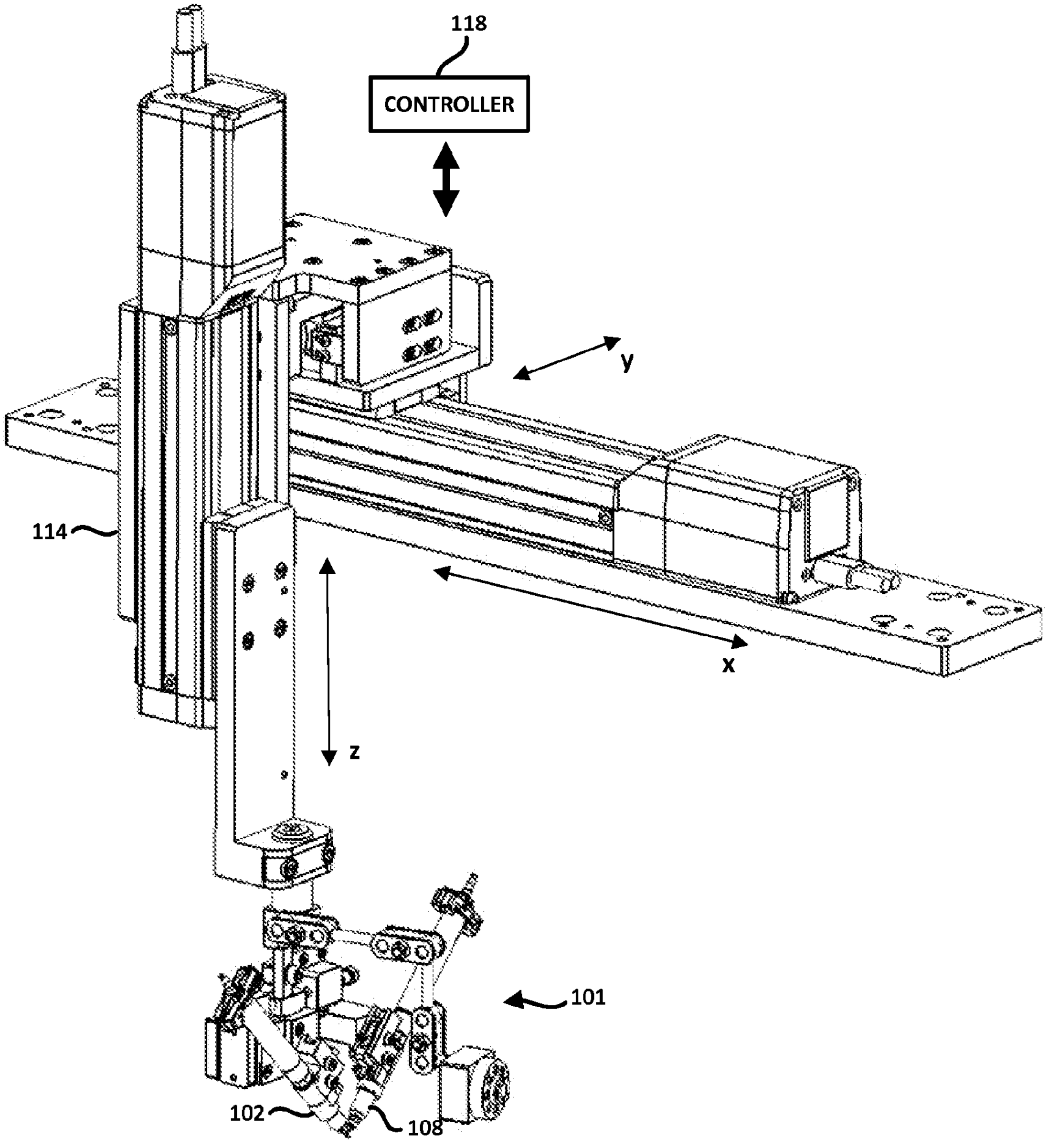
FIG. 1 shows a positioning assembly and a computer-controlled device configured to dispense material at two predetermined locations on an electronic device separated by a distance, according to one embodiment.
Figure 2A:
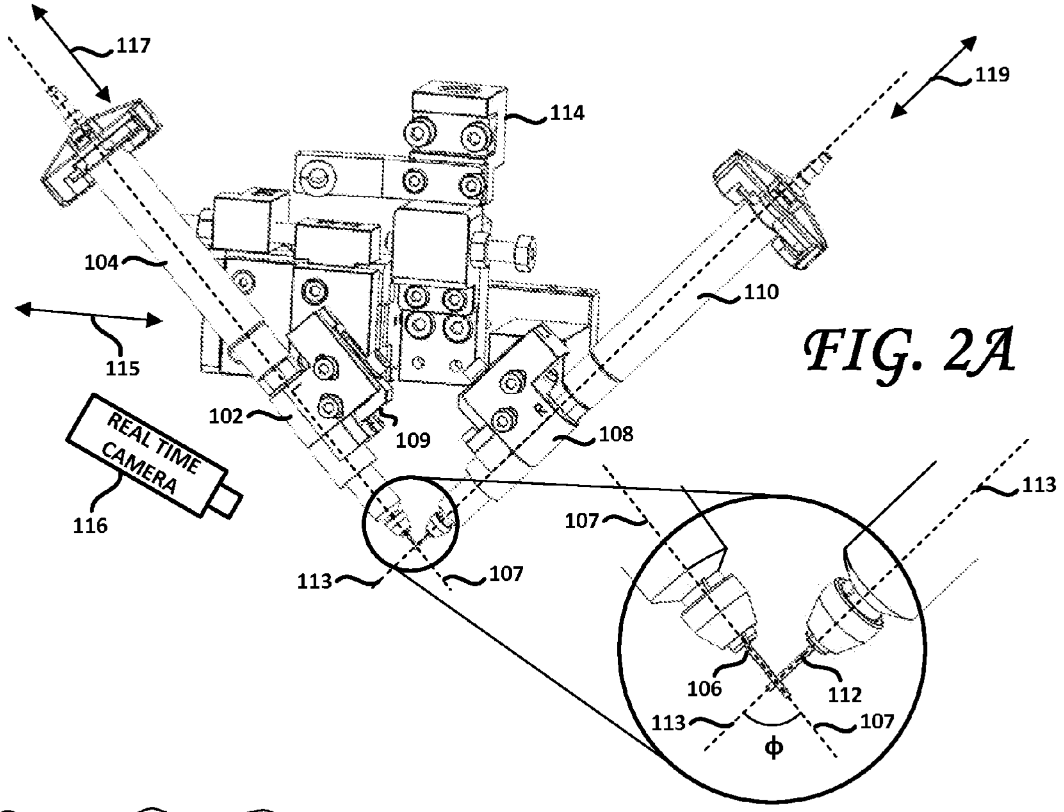
FIG. 2A shows further details of the computer-controlled device of FIG. 1.

FIG. 1 shows a positioning assembly and a computer-controlled device configured to dispense material at two predetermined locations on an electronic device separated by a distance, according to one embodiment. According to one embodiment, such a computer-controlled device may comprise a controller 118 coupled to a positioning assembly 114 that may be configured to precisely position one or more material dispensing assemblies 101 in three-dimensional space. FIG. 1 shows one embodiment in which a material dispensing assembly 101 comprises a first material dispensing unit 102 and a second material dispensing unit 108. As best seen in FIG. 2A, the first material dispensing unit 102 may comprise a first body portion 104 terminated by a first needle portion 106 that defines a first longitudinal axis 107, and the second material dispensing unit 108 may comprise a second body portion 110 terminated by a second needle portion 112 that defines a second longitudinal axis 113. According to one embodiment, the present computer-controlled device may be configured to dispense material from respective material dispensing free ends of the first and second needle portions 106, 112.

According to one embodiment, and as shown in FIG. 2A, the positioning assembly 114 may be configured to position the first and second material dispensing units 102, 108, under control of the controller 118, such that the first longitudinal axis 107 of the first needle portion 106 intersects (or appear to intersect from at least one point of view) the second longitudinal axis 113 of the second needle portion 112. Herein, the statement that the first longitudinal axis 107 of the first needle portion 106 intersects the second longitudinal axis 113 of the second needle portion 112 is specifically intended to encompass all orientations of the first and second material dispensing units 102, 108 in which the respective longitudinal axes 107, 113 thereof are not parallel. According to one embodiment, the controller 118 may position the material dispensing assembly or assemblies 101 such that the material dispensing free end of the first needle portion 106 is spaced away from the material dispensing free end of the second needle portion 112.

The distance separating the respective free ends of the first and second needle portions 106, 112, according to one embodiment, may be controlled at will by varying the angle $\phi$ collectively defined by the orientation of the first and second longitudinal axes 107, 113 and/or by some other motion of one or more of the first and second material dispensing units 102, 108. Varying the angle $\phi$ and/or moving one or more of the first and second material dispensing units 102, 108, therefore, changes the distance between the material-dispensing free ends of the first and second needle portions 106, 112. The distance between the material-dispensing free ends of the first and second needle portions 106, 112 may also be varied, for example, by moving them farther apart or closer to one another. For example, as shown in FIG. 2A, the first material dispensing unit 102 may be configured to the move in the directions indicated at 115 and/or to slide in a direction parallel to the longitudinal axis 107, as shown at 117. Similarly, the second material dispensing unit 108 may be configured to slide in a direction parallel to the longitudinal axis 113, as shown at 119. The second material dispensing unit 108 may also be configured to move in the directions indicated at 115. In this manner, the first and second material dispensing units 102, 108 may be selectably positioned at will during any manufacturing phase, to facilitate placement and removal of the workpiece or for any other purpose.

According to one embodiment, the positioning assembly 114 may be configured to position the first and second material dispensing units 102, 108, under control of the controller 118, such that the first longitudinal axis 107 of the first needle portion 106 is in a first plane and such that the second longitudinal axis 113 of the second needle portion 112 is in a second plane that is both offset from the first plane and either parallel thereto or intersecting. In this manner, the first needle portion 106 and the second needle portion 112, from one or more points of view, appear to intersect and, from one or more other points of view, do not appear to intersect. Seen from above, therefore, the first needle portion 106 and the second needle portion 112 may appear to be a) disposed along a same plane, b) offset relative to one another and parallel and c) offset relative to one another and intersecting.

According to one embodiment, the present computer-controlled device may be deployed in the manufacture of devices such as electronic devices. Such electronic devices may comprise, for example, two predetermined locations onto which, at some point in the manufacture of the electronic device, a material is to be deposited. The material deposited may comprise, for example, epoxy, an adhesive and/or a conductive material. For example, the material may comprise a conductive and adhesive epoxy. Alternatively, the material may, for example, comprise a solder. The first material dispensing unit 102 and a second material dispensing unit 108 may be configured to deposit other materials or even to remove excess material. Within the present context, the terms "depositing" and "deposit" are deemed inclusive of any action in which a material is transferred from a first material dispensing unit 102 and/or a second material dispensing unit 108 to a workpiece such as, for example, an electronic device. For example, such depositing may take the form of depositing "bumps" of material (also called tacking) and/or one or more layers thereof over a circumscribed area. As noted above, the two predetermined locations onto which the material is to be deposited may be separated by a predetermined distance. Such a predetermined distance may be smaller than the width (measured, for example, perpendicularly to the longitudinal axes 107, 113) of the first material dispensing unit 102 or the second material dispensing unit 108.

To accommodate the widths of the first material dispensing unit 102 and the second material dispensing unit 108, the first and second material dispensing units 102, 108 may be oriented, according to one embodiment, such that the longitudinal axes 107, 113 intersect (or at least appear to intersect from one or more points of view), to enable the material dispensing free ends of the first and second needle portions 106, 112 to be disposed closer to one another than they otherwise could be, but for the aforementioned orientation of their respective longitudinal axes 107, 113. According to one embodiment, the first material dispensing unit 102 and/or the second material dispensing unit 108 may be rotated such that the distance between the material dispensing free ends of the first and second needle portions 106, 112 are spaced apart by a distance that is equal or substantially equal to the distance between the two predetermined locations on the electronic device onto which the material is to be deposited. In FIG. 2A, the first and second needle portions 106, 112 cross one another or at least appear to cross one another from one vantage point. However, the first and second needle dispensing portions 106, 112 need not be so disposed, and may be positioned further apart from one another, in such a manner that they do not cross one another, as shown in the embodiment illustrated in FIG. 2B. As shown therein, although the first and second needle portions 106, 112 do not cross one another, their respective longitudinal do, in fact, cross one another or appear to cross one another from one vantage point.

Figure 2B:
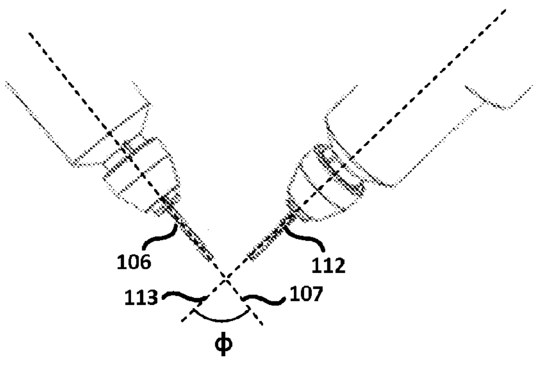
FIG. 2B shows details of a computer-controlled device, according to one embodiment.

In the orientation and configuration of either FIG. 2A or 2B, the material dispensing assembly comprising the first and second material dispensing units 102, 108 need not be repositioned in order to deposit the material at both predetermined locations on which such material is to be deposited. According to one embodiment, the first material dispensing unit 102 may deposit material on one of the predetermined locations and the second material dispensing unit 108 may then dispense material on the other one of the predetermined locations on the electronic device. According to one embodiment, at least a portion of the time period during which the first material dispensing unit 102 is depositing material on one of the predetermined locations may overlap with the time period during which the second material dispensing unit 108 is dispensing the material on the other one of the predetermined locations. For example, the first and second material dispensing units 102, 108 may deposit material on the predetermined locations on the electronic device simultaneously or substantially simultaneously.

As shown in FIG. 2A, to enable and/or to aid in precise positioning of these respective free ends of the first and second needle portions 106, 112, one or more machine vision devices 116 may be coupled to the controller 118, such that the controller 118 may receive data back from such machine vision devices for fine-grained position control of the material dispensing assembly 101. For example, the machine vision device or devices 116 may comprise an optical camera, although other imaging modalities may be used in place of or in additional to such an optical camera.

Figure 3:
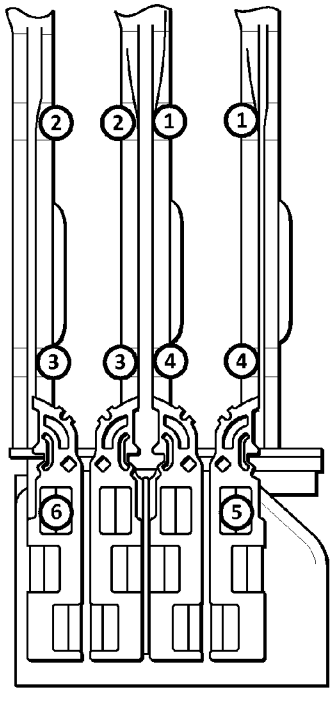
FIG. 3 shows one possible use of the computer-controlled device of FIG. 1; namely to deposit epoxy onto predetermined locations on an HSA of a disk drive, according to one embodiment.

FIG. 3 shows one possible use of the computer-controlled device of FIG. 1; namely to deposit epoxy onto predetermined locations on an HSA of a disk drive, according to one embodiment. Indeed, FIG. 3 shows a side view of an HSA, showing portions of three actuator arms that support read/write heads of the disk drive. In the illustrative implementation of FIG. 3, the HSA supports four such read/write heads, each configured to write data to and read data from the recording surfaces of two spinning platters. Numerals 1-6 denote predetermined locations on the HSA onto which material is to be deposited. For example, such predetermined locations may be locations at which conductive traces coupled to the read/write heads and pre-amplifiers are to be affixed. Rather than deposit material on each of these predetermined locations individually and in turn, one embodiment comprises positioning the first and second material dispensing units 102, 108 such that the first longitudinal axis of the first needle portion 106 intersects the second longitudinal axis of the second needle portion 112 and such that the material dispensing free end of the first needle portion 106 is spaced away from the material dispensing free end of the second needle portion 112 by the distance separating the two predetermined locations; that is, in this case, by the distance separating the two predetermined locations in FIG. 3 labeled (1). That predetermined distance, in the example, begin developed relative to FIG. 3, is the same or substantially the same predetermined distance that separates predetermined locations (2), that separates predetermined locations (3) and that separates predetermined locations (4).

Thereafter, according to one embodiment, the controller 118 may cause the first and second material dispensing units 102, 108 to dispense material simultaneously (or substantially so) from the respective material dispensing free ends of the first and second needle portions 106, 112 onto predetermined locations (1) on the HSA. Then, the controller 118 may reposition the material dispensing assembly or assemblies 101 and/or the electronic device to relative positions in which the respective material dispensing free ends of the first and second needle portions 106, 112 are located directly over the predetermined locations (2) of the HAS, whereupon material may then be deposited at locations (2). Similarly, the controller 118 may then relocate the material dispensing free ends of the first and second needle portions 106, 112 to deposit material onto predetermined locations (3) and then (4). Alternatively, the order in which material is deposited on the predetermined location pairs (1), (2), (3) and (4) may be different than that described and shown herein.

As shown in FIG. 3, the distance between locations (5) and (6) is greater than the distance between respective location pairs (1), (2), (3) and (4). This means that the respective material dispensing free ends of the first and second needle portions 106, 112 are not properly spaced apart to simultaneously deposit material onto locations (5) and (6). To do so, the angle $\phi$ defined by the first and second longitudinal axes 107, 113 of the first and second needle portions 106, 112 may be changed to change the distance between the free ends of the first and second needle portions 106, 112, or the dispensing assembly or assemblies 101 may be moved after depositing material onto location 5 such that one of the two material dispensing free ends of the first and second needle portions 106, 112 is located over location (6). Alternatively still, as shown in FIG. 4, a single material dispensing unit 402 may take over material dispensing duties for locations on the electronic device that are not spaced to accommodate the material dispensing assembly 101. In this manner, a greater throughput may be achieved, as the material dispensing assembly 101 need not be reconfigured to accommodate different spacings.

The device may further comprise, for example, an ultra violet light (and/or heat, for example) curing station and the controller 118 may be further configured to cause the electronic device to be moved to the curing station after the material has been dispensed thereon. The controller 118 may be further configured to control the first and a second material dispensing units 102, 108 to dispense a dot, bump or layer of material or a layer of material onto the two predetermined locations on the electronic device. According to one embodiment, the first and second material dispensing units 102, 108 may be disposed relative to one another such that the first needle portion crosses the second needle portion above the electronic device.

FIG. 5 shows a computer-implemented method of dispensing material at two predetermined locations, separated by a distance, on an electronic device, according to one embodiment. The computer-implemented method may comprise, as shown at B51, providing a first and a second material dispensing unit, the first material dispensing unit comprising a first body portion terminated by a first needle portion that defines a first longitudinal axis, the second material dispensing unit comprising a second body portion terminated by a second needle portion that defines a second longitudinal axis, the first and second needle portions being configured to dispense material onto the electronic device from respective material dispensing free ends thereof. As called for by Block B52, the first and second material dispensing units may then be positioned such that the first longitudinal axis of the first needle portion intersects the second longitudinal axis of the second needle portion and such that the material dispensing free end of the first needle is spaced away from the material dispensing free end of the second needle portion by the distance separating the two predetermined locations. Thereafter, as shown at B53, material may then be dispensed, under control of a controller, from the material dispensing free ends of the first and second needle portions onto the two predetermined locations on the electronic device. According to one embodiment, prior to dispensing, the electronic device and/or the first and second material dispensing units may be moved, under control of the controller, such that the material dispensing free end of the first needle portion is disposed over one of the two predetermined locations on the electronic device and such that the material dispensing free end of the second needle portion is disposed over the other one of the two predetermined locations on the electronic device.

According to one embodiment, an HSA epoxy dispenser may include dual epoxy dispense needles configured according to one embodiment, that crisscross to simultaneously deposit dual UV epoxy bumps on separate HSA arms, thereby reducing epoxy dispense time. Indeed, depositing dual epoxy bumps using the dual dispense needles according to one embodiment may take about 20 seconds, whereas depositing a single epoxy bump using a single dispense needle may take about 30 seconds. Therefore, embodiments significantly reduce manufacturing cycle time.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A computer-controlled device configured to dispense material at two predetermined locations on an electronic device separated by a distance, comprising:

a controller;

a first and a second material dispensing unit, the first material dispensing unit comprising a first body portion terminated by a first needle portion that defines a first longitudinal axis, the second material dispensing unit comprising a second body portion terminated by a second needle portion that defines a second longitudinal axis, the first and second needle portions being configured to deposit at least one of an epoxy, an adhesive and a conductive material onto the electronic device from respective material dispensing free ends thereof; and a positioning assembly configured to position the first and second material dispensing units, under control of the controller, such that the first longitudinal axis of the first needle portion intersects the second longitudinal axis of the second needle portion above the electronic device from at least one point of view and such that the material dispensing free end of the first needle portion is spaced away from the material dispensing free end of the second needle portion by the distance separating the two predetermined locations.

2. The computer-controlled device of claim 1, wherein the positioning assembly is further configured to move, under control of the controller, at least one of the electronic device and the first and second material dispensing units such that the material dispensing free end of the first needle portion is disposed over one of the two predetermined locations on the electronic device and such that the material dispensing free end of the second needle portion is disposed over the other one of the two predetermined locations on the electronic device.

3. The computer-controlled device of claim 2, wherein the positioning assembly comprises machine vision.

4. The computer-controlled device of claim 1, wherein the controller is further configured to control the first and a second material dispensing units to dispense the material onto the two predetermined locations on the electronic device substantially simultaneously.

5. The computer-controlled device of claim 1, wherein a width of at least one of the first and second body portions is greater than the distance separating the two predetermined locations.

6. The computer-controlled device of claim 1, wherein the device further comprises an ultra violet light curing station and wherein the controller is further configured to cause the electronic device to be moved to the ultraviolet light curing station after the material has been dispensed thereon.

7. The computer-controlled device of claim 1, wherein the controller is further configured to control the first and a second material dispensing units to dispense one of a dot of material and a layer of material onto the two predetermined locations on the electronic device.

8. The computer-controlled device of claim 1, further comprising a third material dispensing unit that is configured to dispense material and that is disposed near the first and second material dispensing units.

9. The computer-controlled device of claim 1, wherein the positioning assembly is further configured to position the first and second material dispensing units such that the first longitudinal axis of the first needle portion is in a first plane and such that the second longitudinal axis of the second needle portion is in a second plane, wherein the first plane and the second plane are one of a) disposed along a same plane, b) offset relative to one another and parallel and c) offset relative to one another and intersecting.

10. A computer-controlled device configured to dispense material at two predetermined locations on an electronic device separated by a distance, comprising:

a controller;

a first and a second material dispensing unit, the first material dispensing unit comprising a first body portion terminated by a first needle portion that defines a first longitudinal axis, the second material dispensing unit comprising a second body portion terminated by a second needle portion that defines a second longitudinal axis, the first and second needle portions being configured to dispense material onto the electronic device from respective material dispensing free ends thereof, the first and second material dispensing units being disposed relative to one another such that the first needle portion crosses the second needle portion above the electronic device; and a positioning assembly configured to position the first and second material dispensing units, under control of the controller, such that the first longitudinal axis of the first needle portion intersects the second longitudinal axis of the second needle portion from at least one point of view and such that the material dispensing free end of the first needle portion is spaced away from the material dispensing free end of the second needle portion by the distance separating the two predetermined locations.

* * * * *